United States Patent [19]

Morrison

[11] Patent Number: 5,490,890
[45] Date of Patent: Feb. 13, 1996

[54] METHOD FOR MAKING EMBOSSED LAMINATED FOAM ARTICLES

[75] Inventor: Clark Morrison, West Bloomfield, Mich.

[73] Assignee: Actex, Madison Heights, Mich.

[21] Appl. No.: 297,411

[22] Filed: Aug. 29, 1994

Related U.S. Application Data

[63] Continuation of Ser. No. 47,036, Apr. 12, 1993, abandoned, which is a continuation of Ser. No. 797,696, Nov. 25, 1991, abandoned.

[51] Int. Cl.$^6$ ..................................................... B32B 31/20
[52] U.S. Cl. .......................... 156/66; 156/219; 156/222; 156/308.2; 156/309.6; 156/583.4
[58] Field of Search ................................ 156/219, 220, 156/78, 79, 66, 91, 581, 222, 583.4, 290, 245; 24/305; 264/293; 428/99, 100; 297/DIG. 1, DIG. 2, 309.6, 308.2

[56] References Cited

U.S. PATENT DOCUMENTS

| | | | |
|---|---|---|---|
| 3,308,490 | 3/1967 | Cacioppo | 428/100 X |
| 3,629,035 | 12/1971 | Kuroda | 156/581 X |
| 4,302,272 | 11/1981 | Phillips et al. | 156/78 X |
| 4,470,857 | 9/1984 | Casalou | 156/66 |
| 4,541,885 | 9/1985 | Caudill, Jr. | 156/220 |
| 4,795,517 | 1/1989 | Elliott et al. | 156/290 X |
| 4,867,826 | 9/1989 | Wayte | 156/219 |
| 4,925,513 | 5/1990 | Witzke | 156/220 X |

OTHER PUBLICATIONS

Kirk–Othmer, *Encyclopedia Of Chemical Technology*, Third Edition, vol. 11; Dec. 11, 1980.

*Primary Examiner*—Michele K. Yoder
*Attorney, Agent, or Firm*—Harness, Dickey & Pierce

[57] ABSTRACT

The present invention provides a unique and rapid method of producing a laminate foam or matted yarn article having permanent, pliable, decorative embossing lines or patterns which produce a relief-like article such as an embossed seat cushion or cover or the like.

8 Claims, 3 Drawing Sheets

METHOD FOR MAKING EMBOSSED LAMINATED FOAM ARTICLES

This is a continuation of U.S. patent application Ser. No. 047,036, filed Apr. 12, 1993, which is a continuation of Ser. No. 797,696, filed Nov. 25, 1991 both abandoned.

The present invention relates generally to laminated foam articles and more specifically to methods for fabricating embossed foam laminates.

BACKGROUND OF THE INVENTION

Various methods are known for securing multiple sheets of materials together to form a thicker product, the properties of which differ from the individual sheets. Lamination processes of this type are used widely to adhere or bond thin sheets of flexible foam to a sheet of cover material and, in many instances, to a piece of backing material. The foam laminate is cut to the desired shape with a cutting machine. For example, a foamed article may be die cut from a laminate sheet by the impact of a die against the sheet. Hot wire cutting may also be used in some applications. These soft foam articles are then used for a number of purposes such as seat cushions, back cushions and the like.

A variety of foams, cover materials and backings are available for use in producing shaped foam articles. The most widely used foam is polyurethane. Polyurethane is a polymer which is produced by the condensation of a polyisocyanate and a hydroxyl-containing material, usually a polyol. In order to "foam" the polyurethane to form a polyurethane foam, a blowing reaction is induced using a blowing agent. The blowing agent may comprise one or more substances which vaporize during the reaction of the polyisocyanate and the polyol such as a fluorocarbon, or the blowing agent may react chemically with the isocyanate to produce a gas such as the reaction of water with isocyanate which liberates carbon dioxide. Foam softness is in part a function of the foam density with lower density imparting greater softness. One excellent polyurethane foam for use in forming foam articles is polyether polyurethane foam often referred to simply as polyether foam. Polyether serves as the polyol in the production of polyether polyurethane foam. Urethane foams can be rigid or flexible and can be made in virtually any desired thickness.

Many materials suitable for use as cover material or "body cloth" in forming a laminated foam article are also known, including both synthetic and natural fabrics, blown or cast films, or animal skins and the like. The choice of a body cloth fabric or material is dictated by the end use of the laminate product. Similarly, a backing scrim which is applied to the foamed article on the foam surface opposite that to which the body cloth is adhered may be any of a number of suitable materials.

As will be appreciated by those skilled in the art, it is often necessary or desirable to emboss or impress a pattern upon a laminated foam article for decorative purposes. An embossed design on laminated foam articles is customarily used for seat and back cushions in the manufacture of motor vehicles. Several methods of producing an embossed design are known. Prior art methods include sewing or stitching the laminate such that the desired pattern is formed as the stitches compress regions of the resilient foam. That is, the laminate is sewn so that the foam is compressed along the stitching in a predetermined pattern. An embossed effect is thereby achieved since the foam which is spaced laterally from the area compressed by the stitches is raised relative to the stitching lines.

Another method for achieving an embossed or relief design is described in U.S. Pat. No. 4,400,422. There, a laminate comprising a cover layer of cloth or vinyl material, a backing material or scrim and a layer of foam interposed between the cover and scrim is processed to form intermittent raised areas. A solid object or insert in the shape of a button or the like is preferably inserted between the cover material and the foam layer. Prior to laminating the three layers, both surfaces of the foam are coated with anhydrous polyurethane foam-forming materials. The cover layer and backing are then placed in contact with the coated foam layer and moisture is introduced into the cover and backing material. The button form or the like is then inserted between the cover material and the foam layer and a heated press forces the layers against a die. Water is driven from the backing material into the anhydrous foam-forming materials whereby foaming of the anhydrous polyurethane begins.

As the foaming material expands, it penetrates the interstices of the cover material and the foam layer. In other words, as the water-activated anhydrous polyurethane begins to foam, it expands into the cover material interstices and, simultaneously, into the foam layer at the interface of the two layers. Thus, a bond is formed which secures the cover layer to the foam layer. The same process binds the scrim to the opposite side of the foam layer. In addition, the die protrusions face the two foaming regions at opposite sides of the foam layer together such that the foaming regions bond to one another. The bonding together of these two foaming regions compresses the foam layer along the lines of the die projections, in essence, bonding the cover material to the backing material. The compression of the foam layer at this bond causes a depression or embossed effect surrounding the button form insert. It is disclosed that additional embossed decorative patterns in the fabric can be formed in this manner without the use of a structural form. However, this method may only be used with relatively thin pieces of foam and produces stiff or rigid embossed lines. Moreover, this method requires that the lamination of the cover material and backing to the foam take place simultaneously with the formation of the embossed design which may be impractical in many applications. Also, in order to achieve substantial penetration of the foam layer interstices by the foaming materials, it is necessary to use a low density foam layer.

Another method for achieving an embossed or relief design is described in U.S. Pat. No. 4,867,826, assigned to the Assignee of the present invention, the specification of which is expressly incorporated by reference. There, a laminate is formed by the steps of coating the surface of a foam layer with an adhesive, placing a sheet or layer of cover material on the adhesive-coated foam layer surface, compressing the covered foam layer with a die having heated projection such that regions of the foam layer adjacent the hot die melt to form embossed lines which are permanent yet pliable. Since the embossed lines are actually collapsed, melted regions of the foam layer, thick, high density foam layers may be embossed using the present invention. In another aspect, a trilaminate structure is fabricated by additionally bonding a backing layer to the side of said foam layer opposite that to which said cover material is bonded. In one embodiment, the adhesive is cured during the embossing step by the heat from a heated platen and press. While the '826 patent works satisfactorily, designers are striving to improve the art.

The furniture and nursery industries have used embossed or quilted laminates for many years. However, these laminates have utilized stitching and sewing to provide the embossing. Also, these industries have used spun yarn or matting as their compressible layer.

Thus, it would be desirable to provide a method for making a laminated article having an embossed design which does not require intricate stitching of the laminate or complicated foaming processes. It would still further be desirable to provide such a method by which relatively thick foam layers can be easily embossed and which produces a pliable yet permanent decorative embossed line. The present invention provides such a method for forming an embossed laminated article.

SUMMARY OF THE INVENTION

Figure 1:
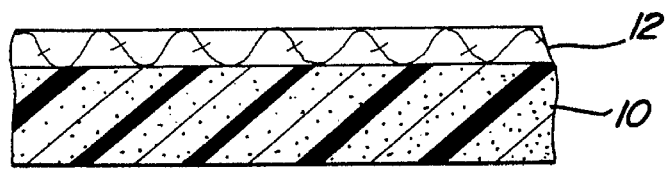
FIG. 1 of the drawings is a cross sectional side view of a bilayer foam article in an intermediate stage of fabrication.

The present invention provides a method for fabricating a laminated article having at least one foam layer to which a cover material is bonded. The method includes the formation of compressed areas or lines of embossment to create a relief-like effect on the surface of the laminated foam article. In one aspect, the method of the present invention comprises the steps of laying a cover material on a foam surface. Next, heated die projections or knives in the configuration of the desired embossment pattern are pressed against the cover material and sufficient pressure is applied to compress regions of the foam layer with the die projections. The temperature of the die projections is sufficient to rapidly melt the foam to form the embossment lines or pattern correspondingly to the die pattern. The heat bonds the body cloth to the foam layer. The article is then rapidly embossed using a heated die or the like to permanently impress the desired pattern into the foam article.

The embossed laminated foam article thus produced has an excellent bond between the cover material and the foam as well as a permanent embossed pattern. The embossment is superior to that achieved by other methods since it is formed by literally melting regions of the foam layer. The cover material is securely attached to the foam layer. Since it is not necessary for foaming materials to penetrate the foam layer, high density foam layers can be utilized. In other words, it is not necessary that the foam layer have a high degree of permeability or penetrability. Moveover, since the joining together of two layers of foaming material on opposite sides of the foam layer is not required as with some prior art methods, a relatively thick laminated foam article can be fabricated using a single thick layer of foam. The embossment lines last indefinitely without change since they are actually melted or collapsed regions of the foam layer. By using high temperature knives or die projections, not only are the embossment lines made permanent, they are formed rapidly which reduces cycle time.

In still another aspect, a spun yarn or matting material is utilized as the compressive or foam type material. In this case, generally, but not always, an adhesive is utilized to bond the cover layer to the spun yarn during the heating process during the impression and melting of the material.

Also, a foam may be flame treated and the cover layer applied to the flame treated surface. In this case, the cover layer is secured or bonded to the foam prior to the entering into the die. Foams of the polyether and/or polyester type are preferably utilized for this process.

Also, a fastening locator member may be secured to the undersurface of the foam. The fastening locator mechanism generally includes either a hook or loop fastener to attach the final laminate onto its final backing member.

In still another aspect, a scrim or backing material is bonded onto the side of the foam or spun yarn layer opposite that of which the cover material is bonded. The trilayer article is then embossed using the hot die projections or knives in the same manner set forth for the bilaminate article. The scrim and cover may be put on with adhesives or flame treated directly to the foam material or heated and formed to the foam. Although the embossing lines are permanent, they are also quite pliable.

DETAILED DESCRIPTION OF THE PREFERRED EMBODIMENT

Figure 2:
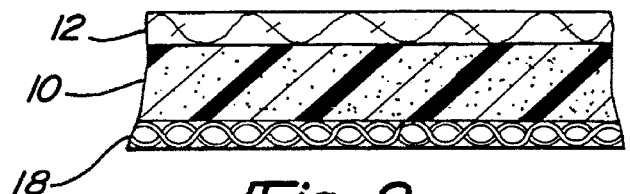
FIG. 2 of the drawings is a cross sectional side view of a trilayer foam article in an intermediate stage of fabrication.

Referring now to FIG. 1 of the drawings, the first step of the present invention is the preparation of foam layer 10 to receive cover material or body cloth 12. Generally, the materials are positioned one upon the other such that the body cloth is in contact with one of the surfaces of the foam layer. The bilaminate is then ready to be placed onto a platen. Also, a scrim 18 may be joined to the underside or other surface of the foam as illustrated in FIG. 2. At this time, a trilayer article would be ready for positioning onto a platen.

A number of materials are suitable for use in forming the bilayer and trilayer. However, in order to obtain compression of foam layer 10 to form the desired embossed pattern, as will be more fully described, foam layer 10 must be compressible. In many applications it will be desirable that the foam layer 10 be quite soft and flexible as in those instances where the final foam article serves as a cushion or the like.

Materials which are suitable for use as foam layer 10 can generally be described as foam plastics which include polyether and polyester foams or combinations thereof. It is understood that the composition of the foam will determine in part whether it is suitable for use in the present invention and that some species of these various classes of foam may not be suitable for use herein. It will also be understood that the choice of a foam for use as a foam layer 10 will depend upon the desired final properties of the laminated foam article. A suitable foam must provide the desired degree of flexibility and resiliency and, as stated, be sufficiently compressible as required during the embossing step of the present invention.

Of the various suitable foams, polyether and polyester foams or combinations thereof are preferred. The preferred foam for use as foam layer for the present invention is polyether and polyester or combinations thereof. The density of foam layer 10 is dictated by the requirements of the final product and it is a feature of the present invention that high density foams are suitable since deep foam penetration is not required. Thus, an integral skin foam having a high density outer region is compatible with the present invention.

The hardness of foam layer 10 determines in part the comfort level of the final product and can be adjusted accordingly. Thus, the degree of foam hardness is not critical to the present invention. Good comfort is provided when foam layer 10 has a hardness of from approximately 5 kg to approximately 26 kg as determined using British standard 3667, which is incorporated herein by reference. In some applications, foam hardness outside this range may be acceptable.

One of the significant advantages of the present invention is that it allows a thick foam layer to be used, although it is to be understood that the process works equally well with thin foam layers. Again, the thickness of foam layers will be determined by the requirements of the final product. A preferred thickness for the foam layer is approximately from 0.125 inches to about 4.00 inches, more preferably from about 0.250 inches to about 2.00 inches.

Body cloth 12 may comprise a wide variety of materials so long as it may be securely bonded to the foam layer. The body cloth 12 should also be sufficiently flexible to be compatible with the embossing step of the present invention. Materials suitable for the use include natural fabrics, such as cotton, wool, or silk, either woven, knitted or pressed, synthetic fabric such as nylon, polyester, polyamides and films such as cellulosic polycarbonate, polyethylene, polypropolene, polyamide, PVC, combinations and blends thereof and other materials. Processed animal skins are also suitable for use in forming body cloth 12. Similarly, scrim 18 may be made of any materials listed as suitable for cover materials. It also may be suitable to make scrim 18 out a more rigid material to add additional structural support to the finished article.

Figure 6:
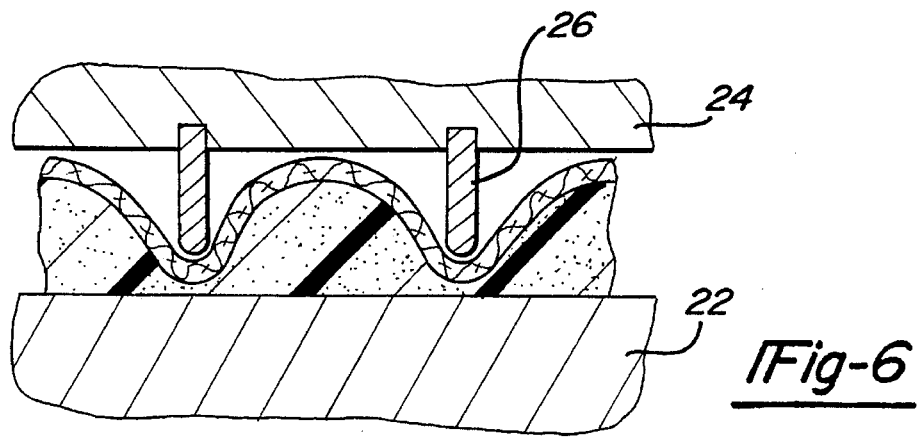
FIG. 6 of the drawings is a cross sectional side view of the article shown in FIG. 1 illustrating the formation of a decorative embossed pattern in accordance with the present invention.

Referring now to FIG. 6 of the drawings, the bilayer article is seen on platen 22. The bilayer article is positioned on the platen 22 with the foam layer in contact with the surface of the platen which, in a preferred embodiment, is heated. Generally the platen is heated to a temperature below the melt temperature of the foam thereby not melting the bottom surface of the foam. In those embodiments which the scrim 18 is present, the scrim layer is positioned onto the platen. A suitable press having an upper platen with die projections or knives 26 is then pressed against the bilayer article 10 in contact with body cloth 12. The movement of the press and knives continues towards platen 22 to compress the foam layer 10. Projections or knives are arranged in the pattern of the desired embossing design.

Figure 7:
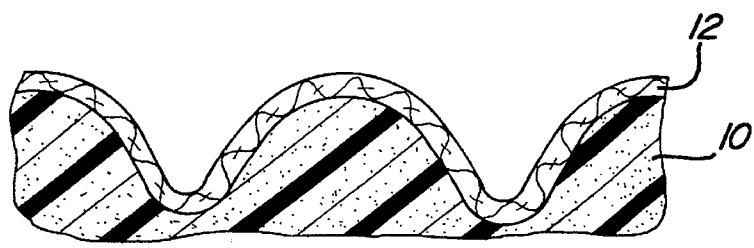
FIG. 7 is a cross sectional side view of the completed bilayer foam article after the decorative pattern has been embossed thereon.
Figure 8:
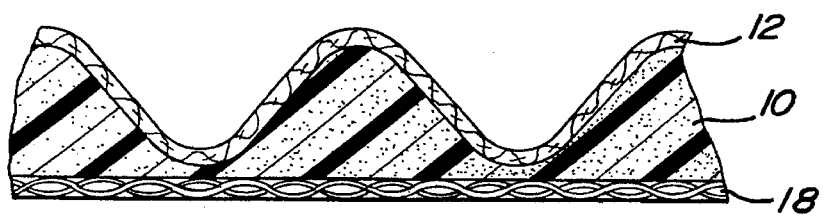
FIG. 8 is a cross sectional side view of the completed trilayer foam article after the decorative pattern has been embossed thereon.

During the compression of foam layer 10 by knives 26, the knives are at a predetermined temperature sufficient to rapidly melt the compressed area of the foam layer 10 which is immediately adjacent the projections 26. Depending upon the embossing platen used, press 24 is also heated. The press 24 is at a temperature at about the melt temperature of the foam or slightly above. As the compressed areas of the foam layer 10 are liquified or melted by the heat and pressure of the projections 26, the foam cells collapse, forming a hard but pliable region corresponding to the contact surface of projections 26. Once collapsed, these melted regions of foam layer 10 do not recover. That is, and referring now also to FIGS. 7 and 8, they solidify in the collapsed state such that the desired pattern is embossed on the finished laminate foam article. The cover layer and scrim have been heat bonded to the foam, and in the case of the cover layer and scrim, bonded to one another. Also, it has been found that the remainder of the surface area of the body cloth, and scrim, since they are heated on the platen, bond to the slightly melted foam to provide sufficient bonding of the body layer to the foam.

One advantage of the present invention is that the embossing process can be carried out rapidly using relatively high heats. It is preferred that those portions of projections 26 which contact the bilayer or trilayer article be at a temperature from about 115° C. to about 220° C., a range which produces especially good results. The compression contact time by projections 26 on the bilayer or trilayer is a function of the thickness of the article layers and the nature of the materials, but is preferably from about 35 to about 110 seconds and more preferably about 75 seconds, which provides a fast cycle time. The time required will also depend upon the temperature of projections 26. The contact time should be just sufficient with these other factors taken into consideration to collapse and melt the foam to form the emboss lines or pattern.

Also, it has been found that the cover layer and scrim layer may be secured to the foam layer by a flame treating process. In this case, the foam would be flame treated to a point where the foam is substantially sticky at which time the cover layer or scrim layer would be pressed onto the foam. Thus, when the temperatures drop, a bond is formed between the body cloth and/or scrim layer. Thus, the material is then ready to be utilized in the above mentioned process.

Figure 3:
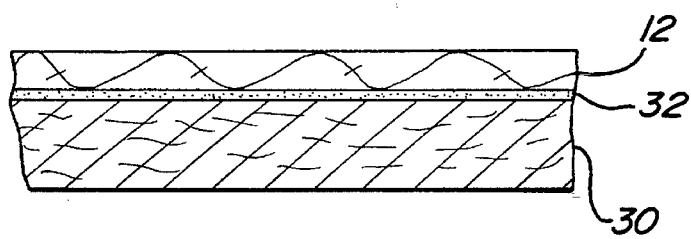
FIG. 3 of the drawings is a cross sectional side view of a bilayer spun yarn article in an intermediate stage of fabrication.
Figure 4:
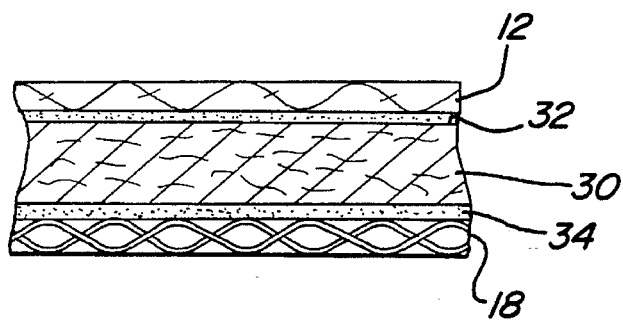
FIG. 4 of the drawings is a cross sectional side view of a trilayer spun yarn article in an intermediate stage of fabrication.

Turning to FIGS. 3 and 4, another embodiment of the invention is shown. It has been found in the furniture and nursery industry, it is desirable to have a spun polyester, polypropolene or cotton type material or combinations thereof to provide a spun yarn, matted or quilted effect to the article. This feel is much softer and more lofted than those presently known.

FIGS. 3 and 4 illustrate a cover layer 12, adhesively secured to a spun yarn 30 or matted layer and/or a scrim layer 18. A sufficient amount of a suitable adhesive is applied to the surface of the matting or spun yarn 30. The adhesive 32 is shown as an exaggerated layer for sake of clarity. The body cloth 12 is then brought in contact with the adhesive 32. Similarly, the opposite side or surface of the matting or spun yarn is coated with an adhesive 34 to which the backing or scrim 18 is joined. It is to be understood that the sequence of stacking the body cloth, matting or yarn layer and scrim may vary depending upon the precise application of the present invention. It may be suitable to apply adhesives directly to the body cloth and scrim, respectively, and therefore join the adhesive coated materials to the matting or yarn layer.

The spun yarn or matting material which is suitable as the matting or foam layer, can generally be described as spun yarns which include spun polyester, spun polypropolene, spun cotton or combinations thereof. It is to be understood that the composition of the yarn or matting will determine in part whether it is suitable for use in the present invention and that some species of various classes of yarns and matting may not be suitable for use herein. It will also be understood that the choice of the matting or yarn for the matting layer will depend in part upon the desired final properties of the laminated article. A suitable matting or yarn must provide the desired degrees of flexibility and resiliency and, as stated, be sufficiently compressible as required during the embossing step of the present invention.

The preferred matting or yarn is a polyester material. The density of the matting or yarn is dictated by the requirements of the final product and it is a feature of the present invention that high density yarns or matting are suitable.

One of the significant advantages of the present invention allows a thick matting or yarn layer to be used, although it is to be understood that the process works equally well with a thin matting or yarn layer. Again, the thickness of the yarn or matting will be determined by the requirements of the final product. A preferred thickness for the matting or yarn layer is approximately from about 0.5 to about 4.0 inches, more preferably from about 1.0 to about 3.0 inches and most preferred from about 1.0 to about 2.0 inches.

The body cloth and scrim are substantially the same as those previously described.

The adhesives utilized may be wet or dry and are substantially like those described in Assignee's prior U.S. Pat. No. 4,867,826, the specification of which is expressly incorporated by reference.

Ordinarily, the amount of adhesive required will depend somewhat on the nature of the materials used for the yarn or matting layer, body cloth and scrim. For most purposes, the application is from about 5 to about 70 grams of adhesive per square meter of surface of matting or yarn layer, and more preferably from about 10 to about 40 grams of adhesive per square meter of surface of matting or yarn layer gives excellent results.

The entire surface of the body cloth is bonded in this manner to the matting or yarn layer so that no puckering or wrinkling of the body cloth relative to the matting or yarn layer occurs during the embossing process. The adhesive is preferably wet polyurethane, but a dry adhesive may also be used. Use of the wet adhesive results in a more flexible and pliable final article.

The bilayers and trilayers of FIGS. 3 and 4 are then positioned into the press like that illustrated in FIG. 6. However, while the temperatures are between 115° C. and 260° C. with the top platen being roughly 20° C. to 30° C. higher than that of the lower platen, the time for carrying out the invention is different. A stamp time for bonding the matting or yarn material to the cover and scrim is generally from about 2 to 20 seconds, preferably, from about 4 to about 12. By keeping the temperature of the scrim or bottom layer lower than the melt temperature of the matting or yarn material, it is possible to produce an insert without loss of loft and as a consequence tends to have a greater definition in the embossing and a much softer feel.

Figure 9:
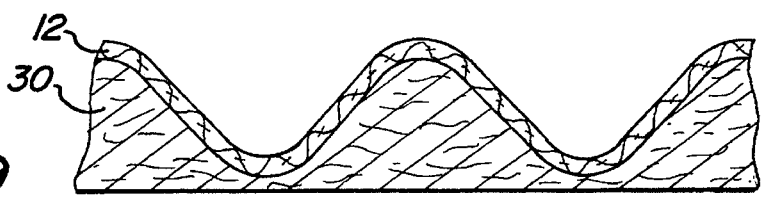
FIG. 9 is a cross sectional side view of the completed bilayer spun yarn article after the decorative pattern has been embossed thereon.
Figure 10:
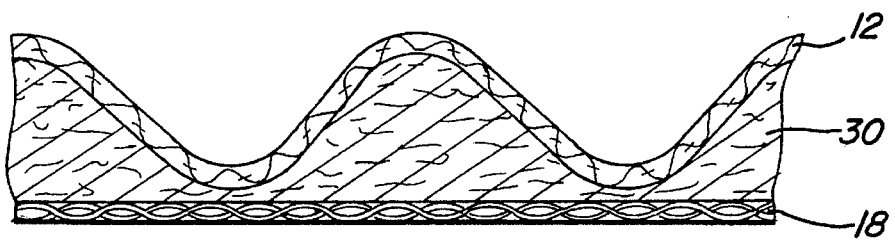
FIG. 10 is a cross sectional side view of the completed trilayer spun yarn article after the decorative pattern has been embossed thereon.

FIGS. 9 and 10 illustrate the solidified and collapsing state such that the desired pattern is embossed on the finished laminated matted or yarn article. Having formed an adhesive bond between the layers, the adhesives are not depicted.

Figure 5:
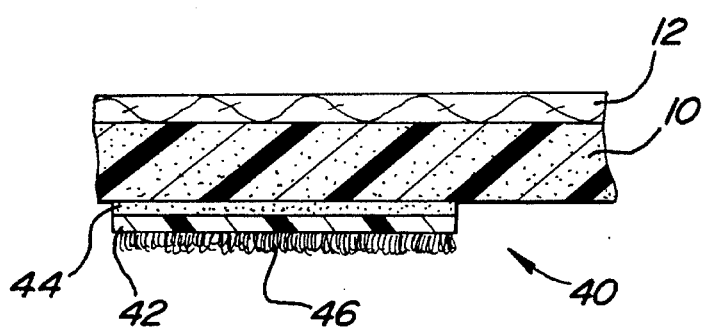
FIG. 5 of the drawings is a cross sectional side view of a bilayer foam article in an intermediate or final stage of fabrication.

Turning to FIG. 5, an additional embodiment of the present invention is shown.

FIG. 5 illustrates a foam like that formed in FIG. 1. However, in FIG. 5, a fastening locator mechanism 40 is utilized on the foam. Also, this fastening locator mechanism 40 could be utilized on any of the above mentioned laminated articles. Generally, the fastening locator mechanism 40 includes a polyurethane film 42 or other suitable bonding material with an adhesive 44 thereon including a fastening mechanism 46 such as a hook or loop fastener. Also, the fixing mechanism 40 may be joined directly to the film 42 by a hot roller lamination process. The above described process is utilized to manufacture the laminate of FIG. 5 with a fixing mechanism 40.

A bilaminate is formed with a polyurethane film 42 and the tape of the hook or loop fastener 46. The melt characteristics of polyurethane tape are such that it will soften and melt as temperatures within a normal operating range of the manufacturing equipment described above. Strips of tapes are placed onto a shuttle table on a stamping press in a predetermined location that will line up with the position of the manufacturing tools held in the top portion of the stamping press.

Figure 11:
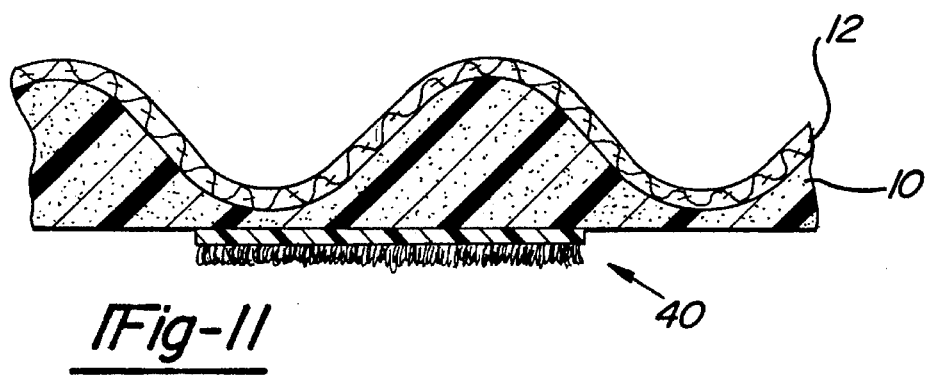
FIG. 11 is a cross sectional side view of the completed bilayer foam article after the decorative pattern has been embossed thereon.

The bilaminate or trilaminate described above is positioned onto the shuttle table and press. The polyurethane film is in contact with the foundation scrim or the foam of the tri- or bilaminate. The shuttle table then moves into the heated press to start the operation cycle as described above. As the press and projections come down with the heated platen, the tape is bonded to the surface of the laminate. The tape is firmly attached to the fabric foundation so that it will secure with a corresponding fastener on an article. Also, as illustrated in FIG. 11, the embossing will be permanent like that previously described.

Figure 12:
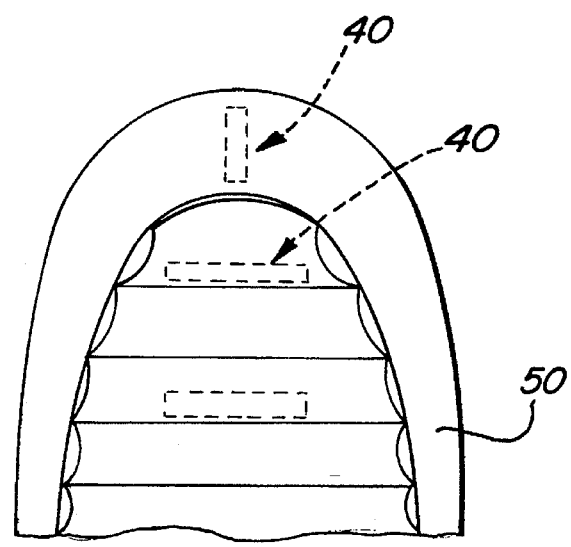
FIG. 12 is a front elevational view of an embossed seat cushion fabricated using the method of the present invention with the fastening locator illustrated in phantom.

FIG. 12 illustrates a cushion fabricated in accordance with the invention of FIG. 5 having several different tape members illustrated in phantom on the backside of the cushion 50. The cushion 50 would then be applied to a seat back or the like so that it would affix to the corresponding fastener.

Having now fully described the invention, it will be understood by those of ordinary skill in the art that the same can be performed with a wide and equivalent range of parameters, conditions and methodology without effecting the spirit or scope of the invention or any embodiments thereof.

What is claimed is:

1. A method for making a laminated foam article comprising the steps of:

providing a compressible foam layer;

directly contacting a surface of said foam layer with a layer of cover material selected from the group consisting of natural fabrics and synthetic fabrics to form a bilayer;

placing said bilayer on a platen;

contacting said cover material layer of said bilayer with at least one heated projection at a temperature to rapidly melt the foam at the compressed area, said temperature about 115° C. to 220° C.;

heating said platen to a temperature above ambient and less than said projection and below the melt temperature of said foam;

providing a press including said projection, heating said press and said projection and heating said press to have a temperature at about or slightly greater than the melt temperature of the foam such that the temperature of the projection and the press are different and said press being adjacent said cover material layer;

then producing relative movement of said platen and said press with said heated projection to compress regions of said foam layer adjacent said heated projection;

melting and collapsing said compressed regions of said foam layer using the heat of said projection to bond said layers together and to form permanent embossed lines in said bilayer;

melting said foam layer in the area of the press using the heat of the press to bond said layers together and maintaining the temperatures of the projection and press during melting of said foam layer; and removing said melted collapsed regions of said foam material.

2. A method for making a laminated foam article comprising the steps of:

providing a compressible foam layer;

flame treating at least one surface of said foam layer;

directly contacting said flame treated surface of said foam layer with a layer of cover material selected from the group consisting of natural fabrics and synthetic fabrics to form a bilayer;

placing said bilayer on a platen;

contacting said cover material layer of said bilayer with at least one heated projection contacting said cover material layer of said bilayer with at least one heated projection at a temperature to rapidly melt the foam at the compressed area, said temperature about 115° C. to 220° C.;

heating said platen to a temperature above ambient and less than said projection and below the melt temperature of said foam;

providing a press including said projection, heating said press and said projection and heating said press to have a temperature at about or slightly greater than the melt temperature of the foam such that the temperature of the projection and the press are different and said press being adjacent said cover material layer;

then producing relative movement of said platen and said press with said heated projection to compress regions of said foam layer adjacent said heated projection;

melting and collapsing said compressed regions of said foam layer using the heat of said projection to form permanent embossed lines in said bilayer;

melting said foam layer in the area of said press using the heat of the press to bond said layers together and maintaining the temperatures of the projection and press during melting of said foam layer; and removing said projection from said bilayer and solidifying said melted collapsed regions of said foam material.

3. The method according to claim 2, wherein said projection contact said cover layer for a period of from about 35 to about 110 seconds to form said permanent embossed lines.

4. The method according to claim 2, wherein said foam material is selected from the group consisting of polyether or polyester foams or combinations thereof.

5. A method for fabricating a laminated foam article comprising:

providing a layer of foam material having two sides;

flame treating both sides of said foam material;

directly contacting one of said flame treated sides of said foam layer with a cover material selected from the group consisting of natural fabrics and synthetic fabrics to form a bilayer;

contacting the other flame treated side of said foam layer with a backing material to form a trilayer;

placing said trilayer on a platen with said backing material adjacent said platen;

providing a press having an attached die, said die having at least one heated die projection;

contacting said cover material of said trilayer with said die projections contacting said cover material layer of said trilayer with at least one heated projection at a temperature to rapidly melt the foam at the compressed area, said temperature about 115° C. to 220° C.;

heating said platen to a temperature above ambient and less than said projection and below the melt temperature of said foam;

heating said press and said at least one projection and heating said press to have a temperature at about or slightly greater than the melt temperature of the foam such that the temperature of the projections and the press are different and said press being adjacent said cover material layer;

then compressing said regions of said trilayer on said platen by causing relative movement of said die projections toward said platen to compress regions of said foam layer adjacent said die projections;

melting and collapsing said compressed regions of said foam layer using the heat of said at least one die projection to bond said cover layer to said backing layer and to form permanent embossed lines in said trilayer;

melting said foam layer in the area of said press using the heat of the press to bond said layers together and maintaining the temperatures of the at least one die projection and press during melting of said foam layer; and removing said at least one die projection from said trilayer;

whereby the melted regions of said foam layer solidify forming embossed lines and whereby said cover material bonds with said backing material.

6. The method according to claim 5, wherein said projections contact said cover layer for a period of from about 35 to about 110 seconds to form said permanent embossed lines.

7. The method according to claim 5, wherein said foam material is selected from the group consisting of polyether and polyester foams or combinations thereof.

8. A method of attaching a fastening locator mechanism to a laminate comprising:

providing a compressible foam layer;

directly contacting a surface of said foam layer with a layer of cover material selected from the group consisting of natural fabrics and synthetic fabrics to form a bilayer;

positioning a fastening locator mechanism on a platen;

placing said bilayer on said fastening locator mechanism on said platen such that said fastening locator mechanism is positioned at a desired position with respect to said bilayer;

contacting said cover material layer of said bilayer with at least one heated projection contacting said cover material layer of said bilayer with at least one heated projection at a temperature to rapidly melt the foam at the compressed area, said temperature about 115° C. to 220° C.;

heating said platen to a temperature above ambient and less than said projection and below the melt temperature of said foam;

providing a press including said projection, heating said press and said projection and heating said press to have a temperature at about or slightly greater than the melt temperature of the foam such that the temperature of the projection and the press are different and said press being adjacent said cover material layer;

then producing relative movement of said platen and said press with said heated projection to compress regions of said foam layer adjacent said heated projection;

melting and collapsing said compressed regions of said foam layer using the heat of said projection to bond said layers together and to form permanent embossed lines in said bilayer;

heating and fastening locator mechanism to bond with said foam layer;

melting said foam layer in the area of said press using the heat of the press to bond said layers together and maintaining the temperatures of the projection and press during melting of said foam layer; and removing said projection from said bilayer and solidifying said melted collapsed regions of said foam material.

* * * * *